March 2, 1926.
N. H. FOOKS
1,575,197
COMBINED COOKER AND COOLER
Filed Feb. 28, 1925     2 Sheets-Sheet 1
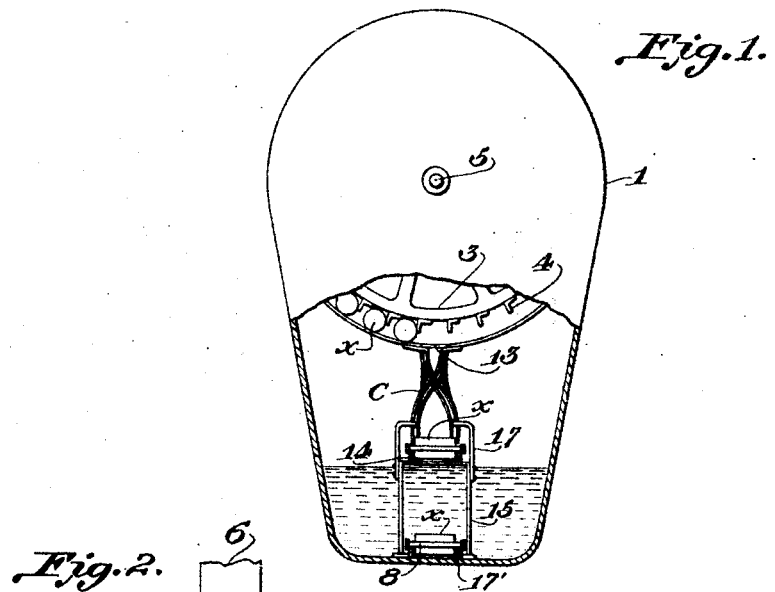
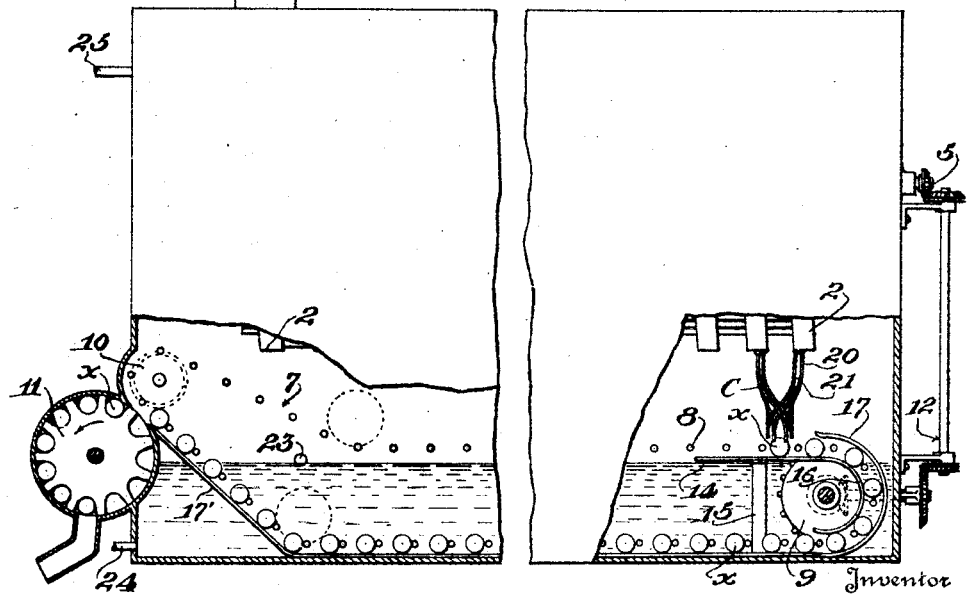
Inventor
Nelson H. Fooks.
By Mason Fenwick & Lawrence
Attorneys March 2, 1926.
N. H. FOOKS
COMBINED COOKER AND COOLER
Filed Feb. 28, 1925    2 Sheets-Sheet 2
1,575,197
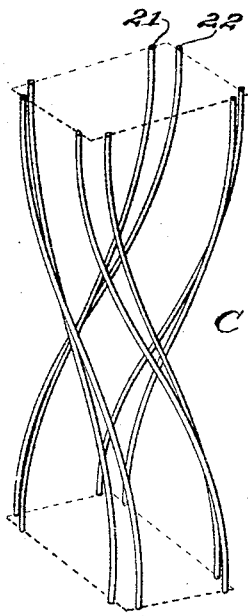
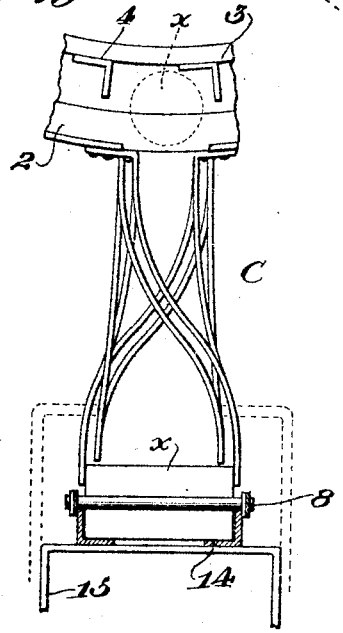
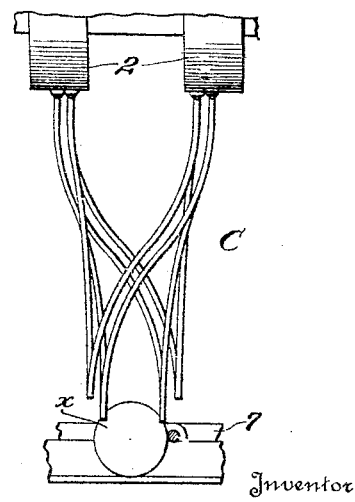
Inventor
Nelson H. Fooks.
By Mason Fenwick & Lawrence
Attorneys Patented Mar. 2, 1926.

1,575,197

UNITED STATES PATENT OFFICE.

NELSON H. FOOKS, OF PRESTON, MARYLAND.

COMBINED COOKER AND COOLER.

Application filed February 28, 1925. Serial No. 12,432.

*To all whom it may concern:*

Be it known that I, NELSON H. FOOKS, a citizen of the United States, residing at Preston, in the county of Caroline and State of Maryland, have invented certain new and useful Improvements in Combined Cookers and Coolers; and I do hereby declare the following to be a full, clear, and exact description of the invention, such as will enable others skilled in the art to which it appertains to make and use the same.

This invention relates to improvements in apparatus for heat-treating substances, such as food products, contained in sealed receptacles, such as tin cans, and has for its object to provide an apparatus which will permit the cans to be transferred from a cooking medium to a cooling medium in a simple and expeditious manner.

Generally stated, the apparatus comprises a cooker having a helical can path along which cans are adapted to be moved in a cooking medium by suitable means, and an endless conveyer on which the cans are receivable for passage through a cooling medium after being cooked. The invention is primarily concerned with the novel manner in which the cans are transferred from the helical can path to the endless conveyer and with the general combination of parts as set forth in the appended claims.

It may be advantageous to mention that the present invention is concerned with an apparatus for effecting the process set forth in my Patents Nos. 1,491,092 and 1,491,093, granted April 22, 1924, and for similar processes.

Referring to the drawings:

Fig. 1 is an end elevation of the improved apparatus partly in section.

Fig. 2 is a side elevation of the apparatus shown in Fig. 1, parts being broken away and parts in section.

Fig. 3 is a perspective view of the can chute for twisting the cans through a 90° angle in a horizontal plane.

Fig. 4 is a fragmentary view on an enlarged scale showing the can chute in position between the helical track and the endless conveyer.

Fig. 5 is a view taken at right angles to Fig. 4.

In the drawings, 1 indicates a shell or container which is adapted to house the conveyer along which the cans are moved while the contents thereof are being subjected to cooking action and the conveyer for supporting the cans while they are being conveyed through the cooling medium after the contents thereof have been cooked. Arranged in the upper part of the container and extending longitudinally thereof is a helical can path generally indicated at 2, and within this can path is arranged a reel 3 for moving the cans $x$ along said can path, the reel being provided with angle irons 4 on its periphery, the cans being moved along the helical can path between radially arranged webs of the angle irons, as will be readily understood, this construction being old and well-known in the art and illustrated in various patents, as for example, my Patent No. 1,318,985, granted October 14, 1919.

The reel is supported on a shaft 5 and suitably driven by mechanism not shown. The cans are fed to the helical can path in any suitable manner, the can feed 6 being generally indicated in Fig. 2. Arranged in the bottom of the container is an endless conveyer generally indicated at 7, this conveyer being so constructed that the cans may be received between the hinges 8 of the conveyer element. The endless conveyer is looped about a suitable sprocket wheel 9 adjacent one end of the tank and above another sprocket wheel 10 at the far end of the tank, and a suitable rotary discharge valve 11 is provided to cooperate with the endless conveyer to receive the cans from the endless conveyer and discharge them into the atmosphere. The sprocket wheel 9 is adapted to be driven by the reel shaft 5 through any suitable gearing generally indicated at 12, the primary consideration being that the endless conveyer shall be driven in certain timely relation with the reel 3 for a purpose which will presently appear.

After the cans have been moved along from one end of the helical can path to the other, they are discharged through an opening 13 and passed by gravity down an inclined chute generally indicated at C to the upper run of the endless conveyer where they are received between the hinges 8 of the conveyer, as previously indicated. For supporting the cans in position in the endless conveyer there is provided a platform 14 which extends below the upper run of the conveyer below the discharge end of the chute C, this platform being supported in any suitable manner as indicated at 15. The supporting platform may conveniently take the form of angle irons 14', indicated in Fig. 1. These angle irons may be extended in arcuate form as indicated at 16 to guide the cans around the loop of the sprocket wheel 9, there being provided an arcuate guide 17 which with the arcuate part 16 of the platform 14 constitutes the channel or guide for the cans in going around the loop, as will be readily understood. The guide 17 may conveniently take the form of angle irons 17', as shown in Fig. 1, and these may be extended along the bottom of the tank beneath the lower run of the conveyer and up to the discharge valve 11.

Extending between the helical can path 2 and the opening 13 therein and the upper run of the endless conveyer of the platform 14 is the can chute C which is adapted to turn the cans through a 90° angle in a horizontal plane, the cans to be passed by gravity from the helical can path to the conveyor. This can chute may conveniently be made of rods, there being a pair of rods 20, 21 for each corner of the can, there being eight rods in all. By providing a pair of rods for each corner of the can, it will be readily apparent that the cans will be guided with a minimum amount of friction and will be easily turned through an angle of 90° while passing downwardly through the chute. The rods constituting the chute are suitably secured at their upper ends to the helical can path and are suitably secured at their lower ends to form a stable structure. It is obvious that the can chute need not be limited to the particular form shown, as any suitable form of can chute may be provided so long as the same is provided with a 90° twist.

The cooling medium through which the cans are passed for cooling will be cool water, and the water level will preferably be maintained substantially on a level with the platform 14, a suitable outlet 23 being provided to maintain the level of the water at that height. Water is supplied to the tank through any suitable conduit as indicated at 24. The cans will be discharged from the endless conveyer into the rotary valve 11 at a point above the level of the water, as shown. The heating medium for cooking the contents of the cans will preferably be steam, and a suitable conduit 25 is provided for supplying steam to the apparatus.

From the above description it will be seen that I have provided a very simple and compact apparatus for enabling continuous cooking and cooling of the contents of sealed receptacles, and that by reason of the conveyer on which the cans are received for conveyance through the cooling medium being arranged below the helical can path the floor space required for the apparatus, is reduced to a minimum. By arranging the apparatus within the single shell or contained as shown the cost of manufacture will be materially reduced.

It is obvious that some changes may be made in various details without departing from the spirit of the invention.

What I claim is:

1. In combination, a can path helically arranged about a horizontal axis, means for moving said cans from one end of the path to the other, a conveyer disposed below said path parallel with the axis thereof, a can chute leading from a point of discharge for cans from the helical can path to said conveyer, said chute having a twist for changing the axis of the helical can path to a position at right angles thereto, said chute discharging said cans direct onto the conveyer.

2. In combination, a tank, a helical can path supported in fixed position therein, said can path having a point of discharge for the cans, an endless conveyer arranged below said helical can path within the tank parallel with the axis thereof, and a can chute leading from the discharge end of said can path directly to the upper run of said endless conveyer, said conveyer adapted to convey the cans away from the discharge end of the chute through a cooling medium within the tank.

3. A combined cooker and cooler comprising a tank, an endless conveyer arranged longitudinally of and within the tank at the bottom thereof, a helical can path fixedly arranged within the tank above said endless conveyer, means for moving the cans from one end of the helical can path to the other, a point of discharge for the cans in said can path, and a can guide extending between said point of discharge and the endless conveyer whereby cans may pass directly from said can path to the conveyer and be deposited on the latter for passage through a cooling medium within the tank.

4. In combination, a helical can path, means for moving cans along said path, a point of discharge for cans in the bottom of said path, an endless conveyer below said can path and extending longitudinally thereof, a gravity can guide leading from said point of discharge to the endless conveyer, a container within which all of the aforesaid parts are housed, the bottom of the container adapted to contain a cooling medium through which the said conveyer may pass.

In testimony whereof I affix my signature.

NELSON H. FOOKS.